Nov. 28, 1967 W. HORNBERGER 3,355,541
ELECTRIC CABLE TERMINAL ASSEMBLY WITH
RESTRAINED RESILIENT MEMBER
Filed Oct. 12, 1964 2 Sheets-Sheet 1
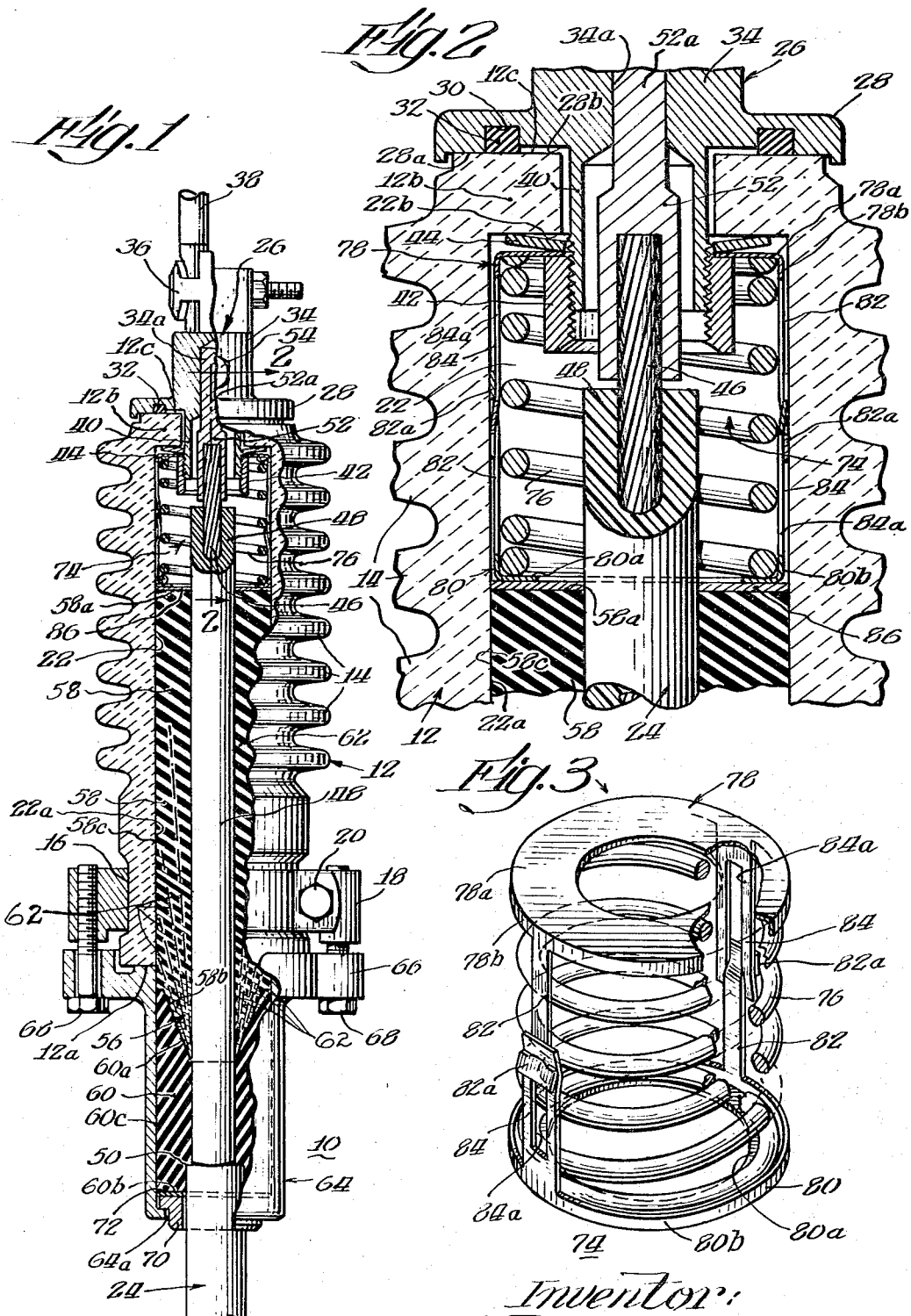
Inventor:
Walter Hornberger
By Mason, Kolehmainen, Rathburn & Wyss Attys

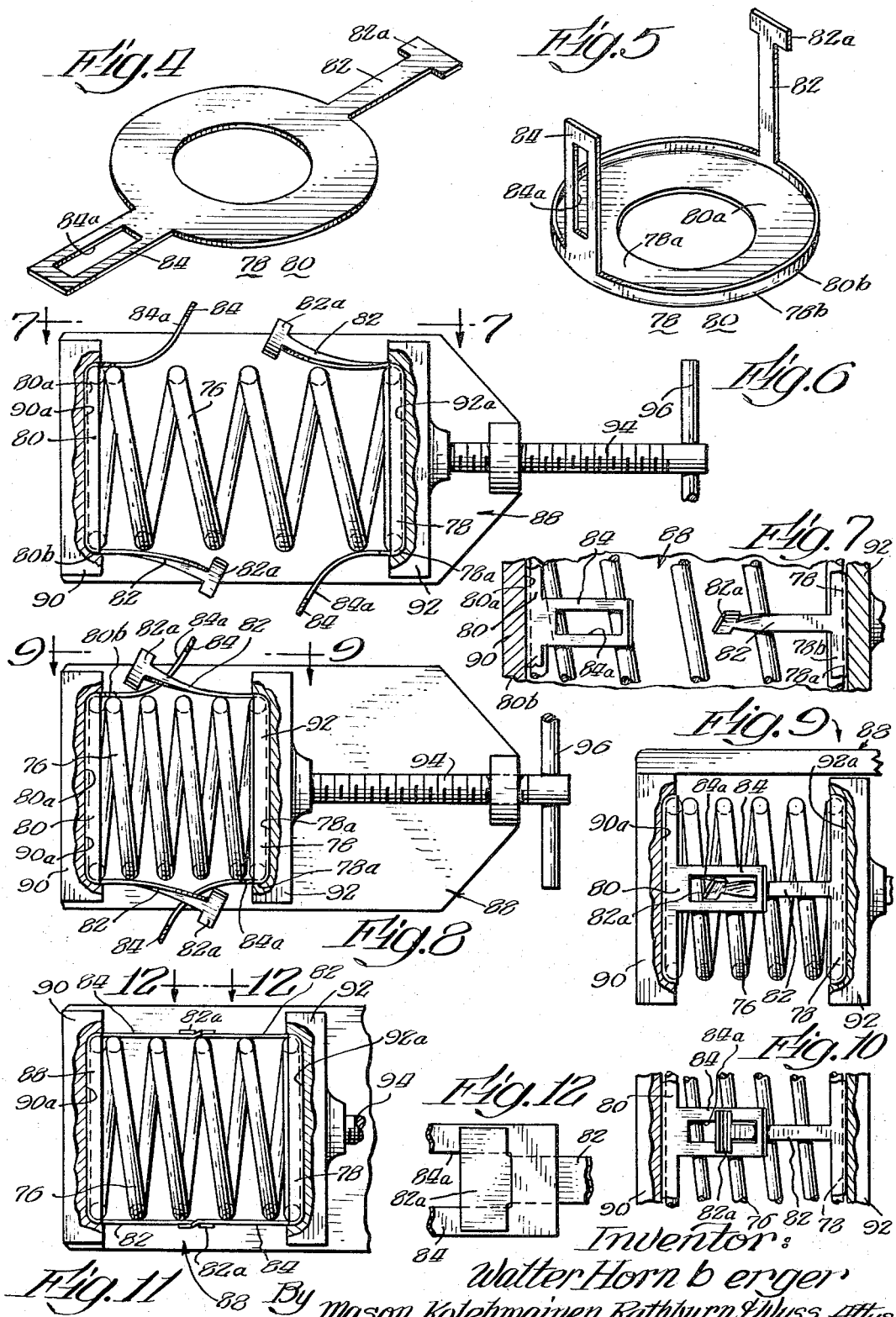

United States Patent Office 3,355,541
Patented Nov. 28, 1967

3,355,541
ELECTRIC CABLE TERMINAL ASSEMBLY WITH RESTRAINED RESILIENT MEMBER
Walter Hornberger, Lyons, Ill., assignor to Joslyn Mfg. and Supply Co., Chicago, Ill., a corporation of Illinois
Filed Oct. 12, 1964, Ser. No. 403,211
9 Claims. (Cl. 174—73)

ABSTRACT OF THE DISCLOSURE

A cable terminating apparatus including a housing with an open-ended cavity, a tubular elastic filler slipped onto the end portion of the cable and inserted into the cavity and means for applying pressure against the outer end of the filler to force the filler into said cavity. Resilient means is mounted in the cavity acting between the housing and the inner end of the filler to exert a resilient end force against said filler upon insertion of the filler into the cavity. A restrainer is provided to maintain the resilient means in a partially compressed condition prior to insertion of the filler into the cavity to thereby exert a minimum preselected resilient force against the filler upon its insertion into the cavity.

---

The present invention relates to cable terminal apparatus and is an improvement on the apparatus disclosed and claimed in U.S. Patent 3,290,428 issued Dec. 6, 1966, on an application the original of which was filed Oct. 3, 1961, and which patent is assigned to the same assignee as the present application.

High voltage cable terminating apparatus of the type disclosed in the above-mentioned copending application includes a rigid insulating housing of porcelain or the like having an open ended cavity or bore for receiving the terminal end of the cable on which is applied a tubular, elastic dielectric filler. The cable end and filler are forced into the cavity by applying end force to the filler. Since the filler is elastic it reacts somewhat like a liquid under pressure and is pressed outwardly against the walls of the cavity and inwardly against the surface of the insulating cover of the cable in a tight fitting, air excluding, interfacial engagement. In order to maintain the filler under the desired end pressure after the air excluding, interfacial engagement has been achieved, a coil spring is disposed between the closed end of the cavity and one end of the filler. When the filler and cable are fully inserted into the cavity, the spring is compressed and exerts a force in the range of 100 to 200 lbs. on the filler to maintain the air free interfacial engagement previously described. During operation of the apparatus contraction of expansion in response to temperature changes is taken up by the compressed spring which continuously applies an end force against the filler to keep the interfacial surfaces referred to above in air free engagement.

It is an object of the present invention to provide a new and improved cable terminating apparatus of the type described.

More specifically, it is an object of the present invention to provide a new and improved cable terminating device of the type described wherein the resilient means of coil spring exerting the endwise force on the elastic filler is provided with means for maintaining the spring in a compressed condition so that a preselected minimum force will be exerted by the spring against the filler upon engagement therewith. Thus, when insertion force is first applied to the filler and cable as these components are inserted into the cavity of the housing, the spring is partially compressed so that it does not engage the filler until the filler has been inserted almost fully into the cavity. Accordingly, insertion of the filler can be accomplished more readily since the spring does not have to be compressed fully from its free or expanded condition by the movement of the filler into the cavity. In accordance with the present invention, the spring is engaged by the filler only during the later stages of the insertion of the filler within the cavity so that the spring exerts an initial relatively large minimum force and further insertion of the filler compresses the spring to exert the desired force on the filler to maintain the proper compression therein.

Accordingly, it is another object of the present invention to provide a new and improved electrical cable terminating device of the type described including a resilient member for exerting end force on the elastic filler which member is restrained in a compressed condition to exert a preselected minimum force against the filler upon engagement therewith.

More specifically, it is an object of the present invention to provide a new and improved restrained resilient member of the type described wherein a coil spring is maintained in compressed condition with restraining members disposed at opposite ends thereof which members have interlocking means for limiting their movement away from one another while permitting movement toward one another.

Yet another object of the present invention is the provision of a new and improved restrained resilient member of the type described in the preceding paragraph wherein the restraining members include smooth, flat portions acting as bearing surfaces to minimize wear that might otherwise be caused by the spring ends.

Yet another object of the present invention is the provision of a new and improved method of producing a restrained resilient member of the type described.

The foregoing and other objects and advantages are accomplished, in accordance with the present invention, by the provision of a new and improved apparatus for terminating an electrical cable comprising a rigid housing of insulating material having an open ended cavity therein for receiving the terminal end of the cable. The cavity is formed by a substantially cylindrical side wall and by an annular end wall opposite the open end of the cavity. A tubular elastic filler fits around an end portion of the insulating cable and the filler and cable are inserted into the cavity of the housing. The filler includes an annular inner end facing the end wall of the cavity and means are provided for applying an end force to the other end of the filler to force the filler and cable into the cavity until the outer peripheral surface of the filler is moved into air-free, interfacial contact with the cylindrical cavity wall and the interior of the filler is moved into air-free interfacial engagement with the insulating cover of the cable. A coiled spring is seated between the cavity end wall and the inner end surface of the filler to exert a resilient end force against the filler for maintaining the air free, interfacial engagement between the interengaging surfaces described above. Restraining means cooperate with the coiled spring to form a spring unit partially compressed to prevent the filler from engaging the unit until it has been almost completely inserted into the cavity. The restraining means comprises a pair of end rings each having a flat, smooth annular end surface, the end surface on one ring being urged toward the annular end wall of the cavity and the end surface of the other ring being urged toward the end of the filler. The end rings are joined together by thin, flat side pieces or legs interlocking to hold the spring partly compressed but occupying little or no space within the cavity. The interlocking pieces are detachably joined together very easily while at the same time, permitting movement of the end rings toward or away from each other as the spring unit is compressed or expanded. The spring unit exerts a preselected minimum resilient force against the filler when it is first engaged and thereafter, as it is compressed it provides sufficient force to maintain the air free interfacial engagements of the filler surfaces with the cavity and the cable insulating cover.

Another aspect of the present invention comprises a new and improved method of producing the restrained resilient member of the type described. The method includes the steps of stamping a pair of restraining members from a flat sheet, each member comprising a ring portion with a pair of diametrically opposed, outwardly extending radial legs. Each stamped member is then drawn to provide a ring-like portion dimensioned to fit over one end of the coiled spring with the legs or side pieces extending alongside the coiled spring in a direction generally normal to the bottom or flat end surface of the ring-like portion. The restraining members thus formed are positioned at opposite ends of the coiled spring with the two pairs of legs aligned. The spring is then compressed between the ring-like portions whereupon the legs of the opposed restraining members are interlocked together in sliding engagement. One leg of each member includes a T-shaped end portion while the other leg has a longitudinal slot therein. The restraining members are interlocked by inserting the T-shaped portions of each member within the slot in the other member, thereby permitting the T-shaped portions to slide within the slot as the spring is expanded or contracted. After the interlocking engagement is effected during assembly the coiled spring is released and permitted to expand freely until the movement is limited by engagement of the T-shaped portions with the outer ends of the slots. The legs are dimensioned to maintain the coiled spring under compression when the outer limit of movement of the restraining members is reached but the T-shaped members may slide within the slots to permit compression of the coiled spring during the cable terminating operation.

The invention, both as to its organization and manner of operation, together with further objects and advantages will best be understood by reference to the following detailed description taken in conjunction with the accompanying drawings, wherein:

FIG. 1 is a sectional view, partly broken away to show certain details, and showing a new and improved cable terminating device characterized by the features of the present invention;

FIG. 2 is an enlarged, fragmentary, sectional view showing the upper end of the cable terminating device and taken along a line substantially corresponding to the line 2—2 of FIG. 1;

FIG. 3 is a perspective view of a spring unit used in the device shown in FIG. 1 with portions of the unit being broken away to facilitate the illustration;

FIG. 4 is a perspective view showing a stamped, flat element used in forming a restraining member for the spring unit shown in FIG. 3;

FIG. 5 is an enlarged perspective view showing the restraining member formed from the element illustrated in FIG. 3 after that element has been subjected to a drawing process;

FIG. 6 illustrates an assembly jig in which the components making up the spring unit have been positioned with restraining members at opposite ends of the coiled spring with the legs of opposite restraining members aligned and twisted in readiness to be locked together;

FIG. 7 is a side, fragmentary view taken substantially along line 7—7 of FIG. 6;

FIG. 8 is similar to FIG. 6 but illustrates the assembly after the jig has been tightened to compress the resilient member and after the legs of the opposing restraining members have been locked together;

FIG. 9 is a fragmentary side elevational view taken substantially along line 9—9 of FIG. 8;

FIG. 10 is a view similar to FIG. 9 but illustrates the assembly as the jig is loosened to permit the resilient member to begin expanding;

FIG. 11 is a view similar to FIGS. 6 and 8 but illustrates the assembly with the jig fully released to permit the spring unit to expand completely until limited by the restraining members; and FIG. 12 is an enlarged fragmentary side view taken substantially along line 12—12 of FIG. 11.

Referring now to the drawings and first to FIGS. 1 and 2, there illustrated is a new and improved cable terminating device 10 of the present invention including a rigid insulating housing 12 constructed of porcelain or the like and formed with a plurality of flutes 14 defining grooves in the upper portion of the housing exterior. An annular recess 16 formed in the external surface of the housing adjacent the lower end accommodates a circular mounting and grounding clamp 18. The latter clamp is formed of metal and is preferably of the split ring type including a tightening screw 20 for drawing the ring segments together to clamp the ring around the housing 12. The clamp 18 is also provided with a radially extending mounting bracket (not shown) for use in mounting the device 10 on a panel or grounding stake as desired.

An enlarged cavity or recess 22 formed internally of the housing has an open lower end and receives the terminal end of an electrical cable 24 and other associated elements which are more fully described hereinafter. The cavity is defined by a cylindrical wall 22a terminating at its lower end in an annular surface 12a. The upper or closed end of the cavity 22 is formed by an inwardly extending end flange 12b providing an annular inner end surface 22b which defies the upper end of the cavity 22. The flange 12b has an annular outer surface 12c forming the top surface of the housing 12.

An electric terminal block 26 at the top of the housing 12 includes an enlarged cover flange 28 overlying the surface 12c. The flange 28 has a first bottom annular surface 28a seating against the surface 12c and a second annular bottom surface 28b concentric with the surface 28a and offset upwardly therefrom. An annular recess 30 is formed between the annular surfaces 28a and 28b to accommodate an O ring type sealing gasket 32 which provides a seal between the flange 28 and the top surface 12c to prevent seepage or foreign matter from entering the cavity 22 along the top of the housing.

The terminal block 26 further includes an upwardly extending body portion 34 having a cable clamping assembly 36 through which a lead wire 38 may be connected electrically and mechanically to the terminal block. The terminal block 26 also includes a downwardly depending hollow tubular stem 40 protruding past the flange 12b and into the upper end of the cavity 22. The lower portion of the tubular stem 40 is externally threaded to receive an annular nut 42 for securing the terminal block 26 firmly to the housing and for drawing the block 26 downwardly to seat the O ring 32 and seal the upper end of the cavity. A Belleville lock washer 44 is disposed between the nut 42 and the end wall 22b of the cavity to prevent inadvertent loosening of the nut after it has been tightened on the tubular stem 40.

The cable 24 is illustrated as including a central conductor 46 surrounded by a concentric insulating cover 48 and an outer conducting ground shield or jacket 50. The cable 24 is prepared for termination by first removing a portion of the jacket 50 for a preselected distance from the end of the cable and then removing a portion of the insulating cover 48 for a much shorter distance from the cable end to leave a portion of the inner conductor 46 exposed for connection as illustrated in FIGS. 1 and 2. After preparation of the cable in the manner described, a connector fitting 52 is swedged on to the short exposed end of the inner conductor 46 with a swedging tool in a manner well known in the art.

The connector fitting 52 includes a rod-like stem 52a for insertion into a centrally disposed, properly dimensioned blind bore 34a extending upwardly within the body portion 34 of the terminal block 26. After the stem 52a has been firmly seated within the bore 34a, it is maintained in position by means of a set screw 54 which, when tightened, insures a good mechanical and electrical contact between the fitting 52 and the terminal block 26 thus connecting the central cable conductor 46 to the terminal block.

In order to provide for a gradual and symmetrical reduction of the dielectric stress around the cable 24 thereby eliminating or greatly reducing the possibility of corona discharge or arcing, a tubular elastic filler 56 is slipped over the exposed insulating cover 48 before the assembly is inserted into the cavity 22. The filler 56 is illustrated as being formed in two pieces, namely, an upper portion 58 constructed of a non-conducting elastomer with a high dielectric strength and a lower portion 60 formed of a conducting or semi-conducting elastomer.

The upper portion 58 of the filler has an annular, flat end surface 58a facing the annular end of the cavity. The lower end of the portion 58 is conically shaped as indicated at 58b and progressively diminishes towards the bottom to a lower end that is substantially equal to the diameter of the internal bore in the filler. The portion 58 also has an outer peripheral surface 58c tapered slightly to enlarge progressively a small diameter portion at the upper end to a maximum diameter at the upper end of the conical section 58b.

The lower portion 60 of the filler has an upper internal conically shaped end surface 60a dimensioned to conform precisely with the conical end 58b of the upper portion 58 to provide an air free interfacial engagement between these two filler portions. The portion 60 also includes a flat annular lower or outer end surface 60b and an outer peripheral surface 60c which is slightly tapered so that the diameter progressively increases upwardly from a minimum diameter at the lower end to a maximum at the upper end. It should be noted that the grounding jacket 50 of the cable 24 is stripped back to a region within the length of the conducting portion 60 of the filler in order that the electrical potential of the jacket 50 will be maintained around the insulating cover 48 up to a point near the bottom of the conical surface 58b. This provides for a uniform, symmetrical, dielectric stress upon the cable insulation 48 in the region between the stripped back end of the jacket 50 and the lowermost point of the filler insulating portion 58. At the latter point the stress within the insulating cover 48 begins to reduce gradually in a symmetrical manner around the cable. The lines 62 shown in FIG. 1 represent lines of equipotential in the electric field around the cable and they diverge upwardly from the maximum stress point at the lower end of the section 58b, thus indicating that the dielectric stress is gradually and symmetrically reduced.

After the filler 56 has been slipped over the prepared end of the cable 24 and inserted into the cavity 22 of the housing 12 the lower end of the housing is sealed by a cup-like end fitting 64 formed of metal. This fitting has an upper flange 66 facing the clamping ring 18, and a pair of cap screws 68 are threaded into tapped opening in the latter ring for drawing the end fitting 64 upwardly toward the lower end of the housing 12 until the upper surface of the fitting bears against the lower end surface 12a.

The lower end of the cup-like end fitting 64 has an inturned end flange 64a defining a central aperture through which the cable 24 extends. A bushing 70 is supported by the flange 64a and a sealing gasket 72 is disposed above this bushing to seat against the lower end surface 60b of the semiconducting filler portion 60. As the end fitting 64 is drawn upwardly upon tightening of the cap screws 68, the bushing 70 exerts an endwise force against the filler to cause the latter to flow. The maximum diameter portion of the filler adjacent the conical section 58b first engages the cylindrical wall 22a of the cavity and the area of engagement thereafter progresses toward the smaller diameter portions of each end. At the same time, the inner surface of the filler around the bore progressively engages the cable insulation layer 48. These phenomena are fully described in the copending application referred to above to which reference should be made for a better understanding. The progressive engagement of the filler with the cable and the cavity walls expels any air entrapped between the engaging surfaces and, hence, creates areas of air-free, interfacial engagement. The progressive removal of air pockets eliminates the possibility of developing stress pockets which might support corona action and lead to eventual deterioration of the cable insulation and the filler in the immediate area of the pocket.

In accordance with the present invention, a restrained spring unit is mounted within the upper end of the cavity 22 to exert an end force on the filler 56 after the filler has been fully inserted into the cavity in the manner previously described. The spring unit 74 encircles the upper end of the cable and exerts force between the end wall 22b of the cavity and the end surface 58a of the filler 56. The unit includes a heavy coil spring 76 with restraining members 78 and 80 at the opposed ends. The members 78 and 80 have ring portions 78a and 80a respectively seated against the opposed end turns of the coil spring. The ring 80a has a smooth, flat outer end portion resting against a bearing washer 86 positioned on the end 58a of the filler to distribute the spring force over the cross sectional area of the filler. A similar flat portion on the ring 78a is disposed to seat against the Belleville washer 44. The members 78 and 80 are almost identical with the exception that the ring 78a of the upper member has a smaller central opening than that in the ring 80a in order that the nut 42 will bear against the ring 78a to hold the spring unit in place in the upper end of the cavity. The rings 78a and 80a include, in addition to the flat portions described above, cylindrical side walls 78b and 80b respectively encircling the end turns of the spring 76 to maintain the proper axial alignment between the spring and the restraining members 78 and 80.

A pair of diametrically opposed legs 82 and 84 extend away from the cylindrical side portion of each restraining member in a direction parallel to the axis of the spring and toward the other restraining member. The two pairs of legs lie alongside the coil spring and are very thin and flat so that they occupy little or no space within the cavity. The legs of one restraining member are interlocked with those of the other member in a manner to permit limited sliding movement between the legs. The legs 82 may be conveniently termed male legs, since these legs are relatively narrow in width and are adapted for engagement within slots 84a formed in the legs 84, which may be termed female legs. The slots 84a are slightly wider than the width of the narrow male legs 82 and extend along the length of the legs 84 but terminate short of the outer ends thereof to provide a closed end or stop. Each of the male legs 82 includes a T-shaped outer end portion 82a for engaging the closed end of the associated slot 84a to limit the movement of the restraining members 78 and 80 away from one another. The interlocking of the legs 82 and 84 in the manner shown in FIG. 3 thus provides a means for limiting the movement of the restraining members 78 and 80 in a direction away from one another while permitting the movement of these members toward one another as the spring 76 is compressed. The legs are dimensioned in length so that the spring 76 is in a partially compressed condition even when the spring unit 74 is not subjected to compressive forces. Accordingly, a relatively large minimum force must be applied to the spring unit 74 before the spring will be compressed beyond its initial condition.

As an example, if the spring 76 in a free or full expanded condition has a length of 2 inches and a spring constant of 200 lbs. per inch of deflection and assuming a linear relationship between the applied force and resultant deflection of the spring, it would require a force of 100 lbs. to compress the spring to a length of 1½ inches. Also, the force applied to the spring would increase linearly from 0 lbs. to 100 lbs. as the spring is compressed from its 2 inch length to 1½ inches. If, however, the spring 76 was restrained to the length of 1½ inches by the restraining members 78 and 80 it would be necessary to apply a force of 100 lbs. to the assembly to remove the load from the restraining members before any further compression of the spring would occur. It would then be necessary to increase this force above 100 lbs. to obtain further compression of the spring. Thus, in effect, no compression of the spring will occur as the force is increased from zero to the minimum force required to relieve the restraining members 78 and 80.

These unique characteristics are extremely advantageous in the cable terminating operation because the filler 56 can be inserted very easily into the cavity 22 until the end 58a engages the spring unit 74. The initial endwise force applied to the end fitting 64 by tightening the cap screws 68 is not used to compress the spring unit 74 which is already maintained in partially compressed condition by the members 78 and 80. This permits the filler to be inserted easily into the cavity without opposition from the spring unit with the maximum diameter region of the filler at the point where the two conical pictures 58b and 60a meet in engagement with the cylindrical wall 22a. When the filler end abuts the spring unit, the pressure applied by tightening the end fitting causes the progressive movement of the interfacial engagement to proceed toward both ends of the housing at a much faster rate than if the spring 76 were unrestrained and had to be initially compressed from the beginning or initial insertion of the filler. By maintaining the spring 76 in a partially compressed state, the force applied by the filler against the lower end of the spring unit must reach a relatively high value before the spring unit begins to compress further and, as a result, this force is not developed until after the interfacial engagements between the filler, the cable and the cavity are well established and are progressing from the initial contact points toward the ends of the housing. The use of a restrained spring unit 74, shorter in length than an uncompressed spring of the same strength permits a reduction in the overall length of the terminating device, if desired. Moreover, insertion of the filler and cable into the cavity requires less work in the field over a brief time period and completion of the air expulsion process is accomplished in a much shorter time interval. Part of the work in compressing the spring is performed on the jig during assembly of the spring unit, thus reducing the amount of work performed in the field.

When force contact between the spring unit 74 and the inner end surface 58a is established, the force applied to the filler by the spring unit must reach a predetermined minimum value (as for example 75 lbs.) before the end 58a of the filler can further move upward to compress the spring unit.

During this time interval the filler expands laterally to fill the cavity completely thereby to exclude air between the filler and cavity wall and between the filler and the cable insulating cover. The retainers 78 and 80 of the spring unit provide unique means for controlling the parameters necessary to develop the desired air free interfacial engagements within the device. For example where the elastomeric material of the filler is of a "Shore A" hardness in the range of 35 to 45, it is desirable that pressures within range of 45 to 50 p.s.i. be maintained on the filler to insure the continued air free interfacial engagements. Spring forces in the range of 75 to 150 lbs. are required to maintain these pressures within the filler and the use of the restraining members 78 and 80 with the coiled spring 76 provides a new and unique means of obtaining the desired range of spring forces and the desired deflection distance parameters for optimum operation of the system. Removal of the filler and cable from the cavity is also aided by the use of a restrained spring unit as described because once the force between the filler and the spring unit falls below the preselected minimum value upon loosening of the screws 68, the restraining members 78 and 80 absorb the force of the spring 76. Thus, the force exerted on the end 58a of the filler drops off rapidly to permit the filler to be reduced so that the upper portion contracts away from the cavity wall to permit withdrawal.

When using the terminal device 10, the housing 12 may be rigidly mounted on a panel or terminal housing by means of the clamping ring 18 either before or after the cable and filler are inserted into the cavity 22 thereof. The terminal end of the cable 24 is prepared by removing measured lengths of the jacket 50 and insulating cover 48. The compression connector 52 is then swedged onto the exposed short end of the cable conductor 46 by use of a swedging tool in a manner well known in the art. The cup-like end fitting 64 with the bushing 70 and the gasket 72 therein are slipped over the end of the prepared cable 24 and moved downwardly to a point below the upper end of the jacket 50. A coat of silicone grease is applied to the exposed insulating cover 48 and an adjacent short portion of the outer jacket 50. The lower portion 60 of the filler is coated with silicone grease along the conical surface 60a and along the surfaces 60b and 60c whereupon this filler portion is slipped over the end of the cable and moved downwardly into the fitting 64 until it rests against the end of the cable jacket 50. Silicone grease is applied to the surfaces 58b and 58c of the upper filler portion 58 which is then slipped over the end of the cable and moved downwardly until the conical surface 58b is in intimate contact with the surface 60a of the lower filler portion 60.

The bearing washer 86 is positioned on the end 58a of the filler 56 and the assembly is then inserted upwardly into the lower end of the cavity 22 until the stem 52a of the compression connector enters the bore 34a of the terminal block. The cap screws 68 are threaded into the clamping ring 18 and tightened to draw the fitting 64 upwardly until finally the upper surface of the flange 66 abuts the lower end 12a of the housing. During the tightening process, the air free interfacial engagements between the outer periphery of the filler and the cavity wall 22a and between the bore of the filler and the cable begin to progress in the manner previously described. The silicone grease aids in excluding any air between the interfacing surfaces and the grease oozes out around the top and bottom of the filler to carry with it any untrapped air pockets.

During initial tightening of the screws 68, the upper end 58a of the filler is not in force contact with the spring unit 74 since the spring 76 is already maintained in a precompressed condition by the restraining members 78 and 80 and the upper end of the filler moves freely upward until the bearing washer 86 contacts the lower ring 80a of the spring unit. When this occurs, further upward movement of the filler end 58a is opposed by the spring unit 74 until the predetermined minimum force required to remove the load of the spring 76 from the restraining members 78 and 80 is reached. During the time interval between first contact between the filler and spring unit and the time when the predetermined minimum force is reached, the upper portion of the filler expands outwardly and inwardly to complete the expulsion of air. When the maximum compressive force is obtained between the spring unit and filler, the spring unit begins to compress and compression continues until the end fitting contacts the lower end of the housing.

The cavity and the restrained filler 56 are so dimensioned that when the fitting 64 is fully drawn upward to the position wherein the flange 66 engages the lower surface 12a, the spring 76 is in a compressed condition to maintain the desired end force on the filler. When this condition is obtained, the T-shaped end portions 82a of the legs 82 of the restraining members 78 and 80 are spaced from the outer ends of the slots 84a and the full force of the compressed spring 76 is transmitted to the upper end 58a of the filler. As stated previously, the force of the compressed spring on the filler is in the range of 75 to 150 lbs. which is ample to maintain the filler in proper air free engagement even though the device may be subjected to a wide range of temperature conditions to expand or compress the spring as much as 3/8" in either direction from a mean compressed length.

Referring now to another aspect of the invention, the restrained spring unit 74 may be produced in the manner illustrated in FIGS. 4–12 of the drawings. Each of the restraining members 78 and 80 is stamped from a flat piece of thin sheet metal in the form shown in FIG. 4 to include a central annular ring portion with diametrically opposed radially extending legs 82 and 84. During this stamping operation, central apertures are punched in the rings with the apertures in ring 78a being somewhat smaller in diameter than that in the ring 80a for the purpose described above. The stamped members shown in FIG. 4 are then subjected to a drawing or punching operation wherein the annular ring portions are formed into cup-like structures as shown in FIG. 5 to include cylindrical side walls 78b and 80b, respectively. During this forming operation the legs 82 and 84 are bent to extend upwardly as shown in FIG. 5 generally normal to the rings of the member.

The restraining members 78 and 80, after being formed in the configuration of FIG. 5, are positioned at opposite ends of the coil spring 76 and the assembly is then placed in a compression jig 88 as shown in FIGS. 6–11. The jig 88 includes a stationary jaw 90 having a cup shaped recess 90a on the inner face thereof for receiving and centering one end of the spring 76 and its associated restraining member 80. The jig 88 also includes a movable jaw 92 having a cup-shaped recess 92a therein for receiving and centering the opposite end of the spring 76 and its associated restraining member 78. After the spring 76 and associated restraining members 78 and 80 are inserted into the jig 88, one or the other of the members 78 and 80 is rotated if necessary to align the legs 82 and 84 thereof with the corresponding legs 84 and 82 of the opposite restraining member as shown in FIG. 7. The movable jaw 92 is then moved toward the stationary jaw 90 by means of a threaded rod 94 and handle 96 or other appropriate means such as a pneumatic cylinder (not shown) to compress the spring 76 as shown in FIG. 8.

After compression of the spring, the T-shaped ends 82a are inserted into the associated slots 84a. The insertion of the legs 82 requires twisting them to some extent as shown in FIGS. 6–9 to insure that the T-shaped ends 82a are positively interlocked within the associated slots 84a. After this has been accomplished, the jaw 92 of the jig 88 is moved away from the stationary jaw 90 until the jaws no longer exert a compressive force on the spring 76. As this occurs the legs 82 and 84 are twisted into parallel alignment with one another as shown in FIGS. 10 to 12. The T-shaped ends 82a prevent the legs 82 from becoming disengaged from the slots 84a and cooperate with the ends of the slots to limit the expansion of the spring when all pressure of the clamping jig 88 against the spring is removed. The interlocking legs 82 and 84 of the restraining members 78 and 80 thus maintain the spring 76 in a partially compressed condition after the spring unit 74 is removed from the jig 88. From the foregoing it will be seen that restrained spring unit 74 can be produced in a simple, expeditious and economical manner.

Although the present invention has been described by reference to only a single embodiment thereof, it will be apparent that numerous other modifications and embodiments may be devised by those skilled in the art, and it is intended by the appended claims to cover all modifications and embodiments which fall within the true spirit and scope of the present invention.

What is claimed as new and desired to be secured by Letters Patent of the United States is:

1. An apparatus for terminating an electrical cable of the type including a central conductor with a surrounding insulating cover, said apparatus comprising a rigid housing having an open-ended cavity defined therein for receiving an end portion of said cable, a tubular elastic filler disposed around said end portion of said cable and inserted therewith into said cavity, said filler including an inner end and an outer end, means applying end force to said outer end of said filler to force said filler into said cavity, resilient means in said cavity disposed between the housing and the inner end of said filler for providing a resilient end force on said filler and means maintaining said resilient means in a partially compressed condition prior to insertion of the filler into the cavity for exerting a preselected minimum force against the inner end of said filler upon insertion of said filler into said cavity.

2. An apparatus for terminating an electrical cable of the type including a central conductor with a surrounding insulating cover, said apparatus comprising a rigid housing having an open-ended cavity defined therein for receiving an end portion of said cable, a tubular elastic filler disposed around said end portion of said cable and inserted into said cavity, said filler including an inner end and an outer end, means applying force to the outer end of said filler to force said filler into said cavity, coiled spring means disposed in said cavity between the housing and the inner end of said filler for exerting resilient end force on said filler, and restraining means preventing the expansion of said spring means to a non-compressed condition while permitting further compression of said spring means.

3. Apparatus as defined in claim 2 wherein said restraining means comprises a pair of members disposed at opposite ends of said spring means, each of said members including a plurality of legs lying along the length of said spring means, legs on one of said members engaging the legs of the other member in slidable interlocking relation whereby movement of said members away from one another is limited to maintain said spring means in a compressed condition and movement of said members toward one another is permitted during further compression of said spring means.

4. Apparatus as defined in claim 3 wherein a first group of said legs is formed with slot means therein slidably receiving portions of legs in a second group, said legs in said second group including means preventing disengagement of said legs during sliding movement in said slot means.

5. Apparatus as defined in claim 3 wherein said device includes means within said cavity engaging said restraining means and securing said spring means in said cavity.

6. Apparatus for use in exerting a preselected minimum resilient end force on the elastic filler of a cable terminating device comprising a resilient member normally expandable along the length thereof and means for maintaining said resilient member in said compressed condition including a pair of end restraining members having body portions disposed at opposite ends of said resilient member, each of said restraining members including a plurality of restraining legs joined to said body portion and extending toward the other member, each leg on one member slidably engaging a leg on the other member, and interlocking means on pairs of engaged legs for limiting the movement of said members away from one another and permitting movement toward one another against the force of the resilient member.

7. Apparatus for exerting a minimum preselected end force against an elastic filler in a cable terminal device comprising a coiled spring and means for maintaining said spring in a partially compressed condition including a pair of restraining members, each member including a ring portion disposed to bear against one end of said spring, each of said members including a plurality of restraining legs joined to said ring portion and disposed in parallel relation to the longitudinal axis of said spring, a first group of said legs formed with longitudinal slot means therein, a second group of said legs having portions slidable within said slot means of said first group of legs and means interlocking said legs of said first group with legs of said second group for limiting the movement of said ring portions away from one another and permitting movement of said ring portions toward one another against the force of said spring.

8. Apparaus as defined in claim 7 wherein said ring portions include a circular planar segment for exerting force against the end of the spring and a cylindrical side band encircling the spring for centering the ring portion about the end of the spring.

9. Apparatus as defined in claim 7 wherein said legs of said second group include tongue portions extending through said slot means and said interlocking means includes tips formed at the outer ends of said tongue portions and extending transversely outward from said slot means to slide along said legs of said second group.

References Cited
UNITED STATES PATENTS

| | | | |
|---|---|---|---|
| 1,398,810 | 11/1921 | Story | 248—358 |
| 1,939,477 | 12/1933 | West. | |
| 2,886,391 | 5/1959 | Simpson | 312—71 |

FOREIGN PATENTS 279,251  10/1927  Great Britain.

OTHER REFERENCES

Joslyn Advertisement, Electric World, vol. 160 No. 21, Nov. 28, 1963, p. 107.

LARAMIE E. ASKIN, *Primary Examiner.*